United States Patent Office 3,006,814
Patented Oct. 31, 1961

3,006,814
STABILIZED DEXTRAN COMPOSITION
George L. Stanko, Waukegan, Ill., assignor to Abbott Laboratories, North Chicago, Ill., a corporation of Illinois
No Drawing. Filed Apr. 12, 1957, Ser. No. 652,345
7 Claims. (Cl. 167—78)

This invention relates to a composition of matter suitable for therapeutic use as a blood plasma expander and a tissue water removing agent, in particular, stable non-flaking solutions of the polysaccharide, dextran over a useful range of concentrations. The invention also relates to a method of making such compositions.

In its original form, the active ingredient, dextran, of this novel composition is a branched polysaccharide of about 200,000 glucose units with a molecular weight of approximately 40 million. It was first isolated from solutions of beet sugar where it is formed by the action of a contaminating bacterium, *Leuconostoc mesenteroides*. Dextran can be manufactured by other microorganisms acting upon saccharides derived from various foods, such saccharides collectively known as saccharose.

The dextran to be utilizable in a pharmaceutical form must be degraded or hydrolyzed to smaller molecular weights of a more or less defined range. Molecular weights of too great a size may cause injurious reactions upon intravenous injection and molecular weights too small tend to pass out the capillary walls of blood vessels and the glomerular tissue of the kidney without performing its desired function of water binding and plasma expansion.

To meet the requirements of clinical use, the molecular weight of dextran must be an average of 75,000±25,000 with the lowest 5–10% being not less than 25,000 and the highest 5–10% being not more than 200,000. Among other publications, the following United States patents teach methods for depolymerizing dextran to the suitable molecular range: U.S. 2,708,174; U.S. 2,709,150; U.S. 2,644,815; and U.S. 2,565,507.

Dextran of the proper molecular weight range in solution is useful as a plasma expander, usually at a concentration of about 6% in aqueous solution. At such concentrations it has been used to supplement or replace whole blood and plasma in replacing lost blood. Hyperoneotic concentrations of dextran (about 12%) are useful as colloidal osmotic diuretics serving to mobilize interstitial fluid, expanding plasma volume and, consequently, effecting diuresis.

A serious problem entailed in preparing solutions of dextran is "flaking" or formation of crystals resulting from dextran coming out of solution. Crystal formations of a smaller size are identified as "fines." Flaking occurs in the widely used 6% solution form as well as the 12% solution form. This phenomena is observed in the tightly sealed, sterile ampoules in which the dextran solution is contained. It is most likely to occur in the heating cycle when ampoules containing said solution are subjected to any degree of heat increment as, for example, autoclaving.

This flaking presents serious difficulties, for where it occurs, dextran solution containing flakes cannot be used for parenteral administration. The result is a costly waste of time and materials.

It is an object of this invention to provide a composition of matter suitable as a parenteral therapeutic and possessing properties of stability.

It is a further object of this invention to provide a novel composition of matter comprising a therapeutic solution of dextran which has been rendered free from flaking.

A still further object is to provide a method of making a solution of dextran simply and economically, said solution being free from flaking and possessing therapeutic properties.

It has now been found that the problem of flaking in dextran solutions can be obviated by adding to a solution of dextran a suitable humectant or water attracting agent. Polyhydric alcohol humectants may be employed such as propylene glycol, polyethylene glycol, polypropylene glycol, glycerine, sorbitol, mannitol, sorbose, 1,2,6-hexane triol and the like. The concentration of the humectant can be chosen from an operable range between about 1.0% and 10% by weight and by volume. The maximal concentration of any one humectant is limited by the possibility of any irritating properties following parenteral administration. More than one humectant may be combined in the dextran solution to exert additive or synergistic water attracting functions.

A dextran of acceptable molecular weight range is placed in a therapeutically compatible aqueous solution and a humectant or humectants are added thereto.

The solution is filtered, its pH is fixed between 5.0 and 7.0, and then the solution is placed in ampoules, sealed and sterilized.

While any non-toxic humectant is suitable to prevent the formation of fines and flakes in solutions of dextran, the preferred humectant is sorbitol, a hexahydric alcohol, which is a white, odorless, crystalline powder that possesses a sweet, cooling taste, and is highly soluble in water. A 5% concentration of sorbitol in a 6% dextran solution renders such a solution isotonic; i.e. identical in osmotic tension with extracellular body fluids. The sorbitol used in the following embodiments of the invention is obtained under the trade name of Sorbo, an aqueous solution containing 70% sorbitol.

If sorbitol at a lesser concentration, or another humectant, is used which makes the resulting dextran solution less tonic than bodily fluids, such solution can be made isotonic, if desired, by employing appropriate amounts of sodium chloride or other compatible salt.

The following examples present, in detail, several selected embodiments of the invention, but it should be understood that such are presented for the purpose of illustration and are not intended to limit the invention to the exact ingredients and proportions recited therein.

*Example 1*

A solution of dextran is compounded from the following ingredients:

Dextran _____ gm__ 120.0
Sorbitol solution (70%) _____ cc__ 50.0
Activated carbon _____ gm__ 10.0
Injectable water, q.s. 1000.0 cc.

The dextran is dissolved in 800 cc. of water and then the sorbitol solution is added thereto. A filter press is bedded with 5 grams of Darco (activated carbon) and then the filter is blown dry. The dextran-sorbitol solution is filtered and the filter is then blown dry to remove all the solution obtainable. The pH of the solution is adjusted to 6.0–6.5 with 1 N sodium hydroxide solution. The filter is prebedded with another 5 gram portion of Darco, blown dry and then the solution is circulated through the filter until a sparkling clear sample is collected. The filter is blown dry to collect all the solution obtainable.

The solution is placed in ampoules of the desired volume and the ampoules are sealed and sterilized in an autoclave.

The foregoing ampoules contain a solution comprising 12% dextran and 3.5% sorbitol. No flaking occurs in these ampoules upon prolonged storing and under conditions of heating said samples in a 60° C. oven for a period of over 24 hours.

*Example II*

The ingredients and procedure of Example I are employed except that no sorbitol is placed in solution. Formation of flakes occurs within 8 hours when the ampoule is heated in a 60° C. oven.

*Example III*

A solution is compounded from the following ingredients:

Dextran _____ gm__ 60.0
Sorbitol solution (70%) _____ cc__ 50.0
Activated carbon _____ gm__ 10.0
Injectable water, q.s. 1000.0 cc.

The preparation of the solution in a sealed ampoule is conducted by the procedure presented in Example I.

The ampoules contain a solution comprising 6% dextran and 3.5% sorbitol.

*Example IV*

The compositions of Examples I and III are repeated with the exception that only 14.2 cc. of 70% sorbitol solution is used. The finished solutions contain respectively 12% and 6% dextran, and about 1.0% sorbitol.

*Example V*

The compositions of Examples I and III are repeated with the exception that 71.0 cc. of 70% sorbitol solution is used in place of 50.0 cc. thereof. The finished dextran solutions contain respectively 12% and 6% dextran and about 5% sorbitol.

*Example VI*

A solution is compounded from the following ingredients:

Propylene glycol _____ cc__ 30.0
Dextran _____ gm__ 120.0
Activated carbon _____ gm__ 10.0
Water for injection, q.s. 1000.0 cc.

The preparation of the solution in a sealed ampoule is conducted by the procedure presented in Example I.

The ampoule contains a solution comprising 12% dextran and 3% propylene glycol in water.

*Example VII*

A solution is compounded from the following ingredients:

Polyethylene glycol _____ cc__ 30.0
Dextran _____ gm__ 120.0
Activated carbon _____ gm__ 10.0
Water, q.s. 1000.0 cc.

The preparation of the solution in a sealed ampoule is conducted by the procedure presented in Example I.

The ampoules contain a solution comprising 12% dextran and 3% polyethylene glycol.

*Example VIII*

A solution is compounded from the following ingredients:

Glycerine _____ cc__ 30.0
Dextran _____ gm__ 120.0
Activated carbon _____ gm__ 10.0
Water, q.s. 1000.0 cc.

The preparation of the solution in a sealed ampoule is conducted by the procedure presented in Example I.

The ampoules contain a solution comprising 12% dextran and 3% glycerine.

The foregoing examples set out the basic procedure for preparing the novel compositions of this invention. The dextran concentration can be varied within the limits of clinical and therapeutic usefulness. The concentration of the humectant will be sufficient to prevent the formation of flakes and fines.

The named water attracting agents and their equivalents may also be used in combination to obtain additive or synergistic effects in preventing formation of flakes and fines of prepared dextran solutions.

Others may practice the invention in any of the numerous ways which will be suggested by this disclosure to one skilled in the art. All such practice of the invention is considered to be a part hereof provided it falls within the scope of the appended claims.

I claim:

1. A composition of matter consisting essentially of at least about 6% dextran having an average molecular weight of 75,000±25,000 and a molecular weight range between 25,000 and 200,000 dissolved in aqueous media and a water-immiscible, non-toxic, polyhydric alcohol humectant dissolved in said aqueous media at a concentration between about 1 percent and 5 percent.

2. The composition of matter of claim 1 where the humectant is polyethylene glycol present at a concentration of about 3%.

3. The composition of matter of claim 1 where the humectant is glycerine present at a concentration of about 3%.

4. The composition of matter of claim 1 where the humectant is propylene glycol present at a concentration of about 3%.

5. A composition of matter consisting essentially of 6% dextran having an average molecular weight of 75,000±25,000 and a molecular weight range between 25,000 and 200,000 and 3 percent of sorbitol dissolved in water.

6. A composition of matter consisting essentially of 12% dextran having an average molecular weight of 75,000±25,000 and a molecular weight range between 25,000 and 200,000 and 3 percent sorbitol dissolved in water.

7. A composition of matter consisting essentially of dextran having an average molecular weight of 75,000 ±25,000 and a molecular weight range between 25,000 and 200,000 dissolved in aqueous media and a water-immiscible, non-toxic polyhydric alcohol humectant dissolved in said aqueous media at a concentration between about 1 percent and 5 percent.

References Cited in the file of this patent

UNITED STATES PATENTS

| | | |
|---|---|---|
| 2,674,584 | Deniston | Apr. 6, 1954 |
| 2,779,708 | Russell | Jan. 29, 1957 |

FOREIGN PATENTS

| | | |
|---|---|---|
| 165,038 | Australia | Sept. 1955 |
| 522,507 | Canada | Mar. 13, 1956 |
| 187,241 | Austria | Oct. 25, 1956 |

OTHER REFERENCES

Squibb Abstract Bulletin, January 31, 1951, p. A-94.
Sloan et al.: J.A.C.S., September 5, 1954, pp. 4429–4441.
Gropper: Surgy., Gyn., and Obst. 95:6, December 1952, pp. 521–542.
Atlas Sorbitol, Atlas Powder Co., Wilmington, Del., November 1947, pp. 9–17.
Zief: J.A.C.S., pages 2126–2127, April 20, 1952.